US012690106B2

(12) United States Patent
Mosebrook et al.

(10) Patent No.: US 12,690,106 B2
(45) Date of Patent: Jul. 21, 2026

(54) LOAD CONTROL DEVICE FOR CONTROLLING A DRIVER FOR A LIGHTING LOAD

(71) Applicant: Lutron Technology Company LLC, Coopersburg, PA (US)

(72) Inventors: Donald R. Mosebrook, Coopersburg, PA (US); Robert C. Newman, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 21 days.

(21) Appl. No.: 18/830,798

(22) Filed: Sep. 11, 2024

(65) Prior Publication Data

US 2024/0431000 A1 Dec. 26, 2024

Related U.S. Application Data

(63) Continuation of application No. 18/343,831, filed on Jun. 29, 2023, now Pat. No. 12,120,789, which is a continuation of application No. 17/717,670, filed on Apr. 11, 2022, now Pat. No. 11,729,882, which is a continuation of application No. 17/081,968, filed on Oct. 27, 2020, now Pat. No. 11,304,279, which is a continuation of application No. 16/669,477, filed on Oct. 30, 2019, now Pat. No. 10,827,587, which is a continuation of application No. 16/183,565, filed on Nov. 7, 2018, now Pat. No. 10,492,255, which is a continuation of application No. 15/713,543, filed on Sep. 22, 2017, now Pat. No. 10,149,355.

(60) Provisional application No. 62/398,636, filed on Sep. 23, 2016.

(51) Int. Cl.
*H05B 45/37* (2020.01)
*H05B 47/175* (2020.01)

(52) U.S. Cl.
CPC .......... *H05B 45/37* (2020.01); *H05B 47/175* (2020.01)

(58) Field of Classification Search
None
See application file for complete search history.

(56) References Cited

U.S. PATENT DOCUMENTS

| | | | |
|---|---|---|---|
| 5,212,478 | A | 5/1993 | Moseley |
| 8,278,839 | B2 | 10/2012 | Salvestrini et al. |
| 8,492,987 | B2 | 7/2013 | Nuhfer et al. |
| 8,963,440 | B2 | 2/2015 | Baer et al. |
| 9,232,574 | B2 | 1/2016 | Veskovic |

(Continued)

FOREIGN PATENT DOCUMENTS

| | | | |
|---|---|---|---|
| WO | 2015092598 | A1 | 6/2015 |
| WO | 2016100928 | A1 | 6/2016 |

*Primary Examiner* — Jany Richardson
(74) *Attorney, Agent, or Firm* — Michael S. Czarnecki; Glen R. Farbanish; Philip N. Smith

(57) ABSTRACT

If there is an interruption of power to an electrical load while the electrical load is operating at low end, the electrical load may not turn back on when power is restored. This undesired operation may be avoided by detecting the application of power to the electrical load, and automatically increasing the magnitude of a control signal being applied to the electrical load by a sufficient amount for a short period of time after power has been applied. This way, the electrical load may be turned back on to low end, instead of erroneously operating in an electronic off condition.

18 Claims, 5 Drawing Sheets

(56) References Cited

U.S. PATENT DOCUMENTS

| | | | | |
|---|---|---|---|---|
| 9,380,683 | B2 | 6/2016 | Cummings | |
| 9,595,880 | B2 | 3/2017 | Knode et al. | |
| 2011/0080110 | A1 * | 4/2011 | Nuhfer | H05B 45/44<br>315/291 |
| 2012/0286681 | A1 * | 11/2012 | Hausman, Jr. | H05B 41/3924<br>315/307 |
| 2013/0293137 | A1 * | 11/2013 | Jennings | H05B 47/10<br>315/224 |
| 2014/0265918 | A1 | 9/2014 | Cummings et al. | |
| 2015/0244121 | A1 * | 8/2015 | Amelio | H05B 47/196<br>439/620.21 |
| 2016/0036349 | A1 | 2/2016 | Cooper et al. | |
| 2019/0335559 | A1 * | 10/2019 | Shao | H05B 45/44 |

* cited by examiner

LOAD CONTROL DEVICE FOR CONTROLLING A DRIVER FOR A LIGHTING LOAD

CROSS-REFERENCE TO RELATED APPLICATIONS

This application is a continuation of U.S. patent application Ser. No. 18/343,831, filed Jun. 29, 2023; which is a continuation of U.S. patent application Ser. No. 17/717,670, filed Apr. 11, 2022, now U.S. Pat. No. 11,729,882 issued Aug. 16, 2023; which is a continuation of U.S. patent application Ser. No. 17/081,968, filed Oct. 27, 2020, now U.S. Pat. No. 11,304,279, issued Apr. 12, 2022; which is a continuation of U.S. patent application Ser. No. 16/669,477, filed Oct. 30, 2019, now U.S. Pat. No. 10,827,587; which is a continuation of U.S. patent application Ser. No. 16/183,565, filed Nov. 7, 2018, now U.S. Pat. No. 10,492,255; which is a continuation of U.S. patent application Ser. No. 15/713,543, filed Sep. 22, 2017, now U.S. Pat. No. 10,149,355; all of which claim priority to Provisional U.S. Patent Application No. 62/398,636, filed Sep. 23, 2016, the disclosures of which are incorporated herein by reference in their entireties.

BACKGROUND

A lighting source, such as a light-emitting diode (LED) light source, is typically driven by a load regulation device (e.g., such as an LED driver) in order to illuminate. A common control method for dimming an LED light source controlled by an LED driver is "zero-to-ten-volt" (0-10V) control, which is sometimes referred to as 1-10V control. A 0-10V LED driver receives power from an AC power source, with an external mechanical switch typically coupled between the AC power source and the 0-10V driver to provide a switched-hot voltage to the driver. Alternatively, the switched-hot voltage may be generated by an external power device (e.g., a power pack). The 0-10V driver controls the intensity of the connected LED light source in response to a 0-10V control signal received from a 0-10V control device (e.g., a 0-10V controller). Often, the 0-10V control device is mounted in an electrical wallbox and comprises an intensity adjustment actuator (e.g., a slider control). The 0-10 V control device regulates the direct-current (DC) voltage level of the 0-10V control signal provided to the driver between a substantially low voltage (e.g., zero to one volt) to a maximum voltage (e.g., approximately ten volts) in response to an actuation of the intensity adjustment actuator. For example, the 0-10V driver may control the intensity of the LED light source to a low-end intensity $L_{LE}$ (e.g., approximately 0.1%-10%) when the DC voltage level of the 0-10V control signal is at the substantially low voltage (e.g., zero to one volt) and to a high-end intensity $L_{HE}$ (e.g., approximately 100%) when the DC voltage level of the 0-10V control signal is at the maximum voltage (e.g., approximately ten volts).

To turn off the LED light source controlled by the 0-10V driver, power is removed from the 0-10V driver by, for example, controlling the switched-hot voltage to zero volts. The 0-10V control device may comprise a switching circuit for generating the switched-hot voltage. The switching circuit may include, for example, a mechanical air-gap switch, a relay, and/or a bidirectional semiconductor switch, such as a triac, one or more silicon-controlled rectifiers (SCRs), a field-effect transistor (FET) in a rectifier bridge, two FETs in anti-series connection, one or more insulated-gate bipolar junction transistors (IGBTs), or any suitable semiconductor switching circuit. In some cases, the 0-10V control device may be powered via the 0-10V control wires, for example, by drawing current from the 0-10V driver. Prior art 0-10V drivers typically source between 1-2 milliamperes of current, which the 0-10V control device may use to power itself.

Some 0-10 V drivers may be responsive to occupancy sensors, vacancy sensors, and/or daylight sensors. If the switched-hot voltage is controlled to zero volts to turn off the LED light source (e.g., by opening the switching circuit of the 0-10V control device or the power pack), the 0-10V driver will then be unpowered and unable to respond to the occupancy sensors, vacancy sensors, and/or daylight sensors.

Rather than removing power from an 0-10V driver to turn off the LED light source, the 0-10V driver may be controlled to an electronic off (e.g., standby) state in which the 0-10V driver remains powered, but turns off the LED light source. The 0-10V driver may be configured to change between an on state and the electronic off state in response to the 0-10V signal (e.g., using hysteresis). For example, during the on state, the 0-10V control device may be configured to adjust the DC voltage level of the 0-10V control signal between a minimum level (e.g., approximately 0.61-1.00 volts) and a maximum level (e.g., approximately ten volts) to adjust the intensity of the LED light source between the low-end intensity $L_{LE}$ and the high-end intensity $L_{HE}$, respectively. To control the 0-10V driver into the electronic off state, the 0-10V control device may be configured to adjust the DC voltage level of the 0-10V control signal to a standby level. For example, the 0-10V driver may be configured to change to the electronic off state when the DC voltage level of the 0-10V control signal drops below a falling threshold (e.g., approximately 0.6 V). The 0-10V driver may be configured to return to the on state (e.g., to turn on) when the DC voltage level of the 0-10V control signal rises above a rising threshold (e.g., approximately 1.0 V), after which the 0-10V driver may adjust the intensity of the LED light source between the low-end intensity $L_{LE}$ and the high-end intensity $L_{HE}$ as the 0-10V control signal ranges between the minimum level and the maximum level.

Since the falling threshold may be approximately 0.6 V, the DC voltage level of 0-10V control signal may be as low as 0.61 V when the 0-10V driver is being controlled to the low-end intensity $L_{LE}$. This means that the DC voltage level of 0-10V control signal at the low-end intensity $L_{LE}$ may be between the rising threshold and the falling threshold. If there is a momentary interruption of the power, such as a power outage or a manual switch-off of power to the 0-10V driver when the 0-10V driver is in the on state, and the DC voltage level of the 0-10V control signal is between the rising threshold and the falling threshold, the 0-10V driver may not turn back on when power is restored (e.g., re-applied) because the DC voltage level of 0-10V control signal will not be above the rising threshold. It is undesirable for a lighting load that is on to not turn back after a momentary power interruption.

SUMMARY

As described herein, a load control device for controlling an amount of power delivered to a lighting load may comprise a communication circuit configured to generate a control signal for controlling the amount of power delivered to the lighting load. The control signal may cause the lighting load to be turned on when the magnitude of the control signal rises above a threshold. The load control device may also comprise a control circuit configured to control the communication circuit to adjust the magnitude of the control signal so as to adjust an intensity of the lighting load between a low-end intensity and a high-end intensity. The magnitude of the control signal may be less than the threshold when the intensity of the lighting load is being controlled to the low-end intensity. When power has been applied to the lighting load, the control circuit may be configured to determine that a desired magnitude of the control signal is below the threshold, and increase the magnitude of the control signal to be equal to or greater than the threshold before decreasing the magnitude of the control signal to the desired magnitude.

The load control device described herein may include an intensity adjustment actuator and a potentiometer circuit responsive to the intensity adjustment actuator for determining the desired magnitude of the control signal. The load control device may further include a sense circuit configured to provide an indication of when power has been applied to the lighting load. Once power has been applied to the lighting load and the magnitude of the control signal is set to be equal to or greater than the threshold, the control circuit of the load control device may cause the magnitude of the control signal to be decreased to the desired magnitude over a first period of time. The control circuit may maintain the magnitude of the control signal constant at a level equal to or greater than the threshold for a second period of time before decreasing the magnitude of the control signal to the desired magnitude over the first period of time.

Other features and advantages of the present invention will become apparent from the following description of the invention that refers to the accompanying drawings.

DETAILED DESCRIPTION

Described herein are examples of a load control system for controlling the amount of power delivered to an electrical load, such as a lighting load, and more particularly, of a wall-mounted load control device for controlling a load regulation device, such as an LED driver for an LED light source, via a control signal, such as a 0-10V control signal.

Figure 1:
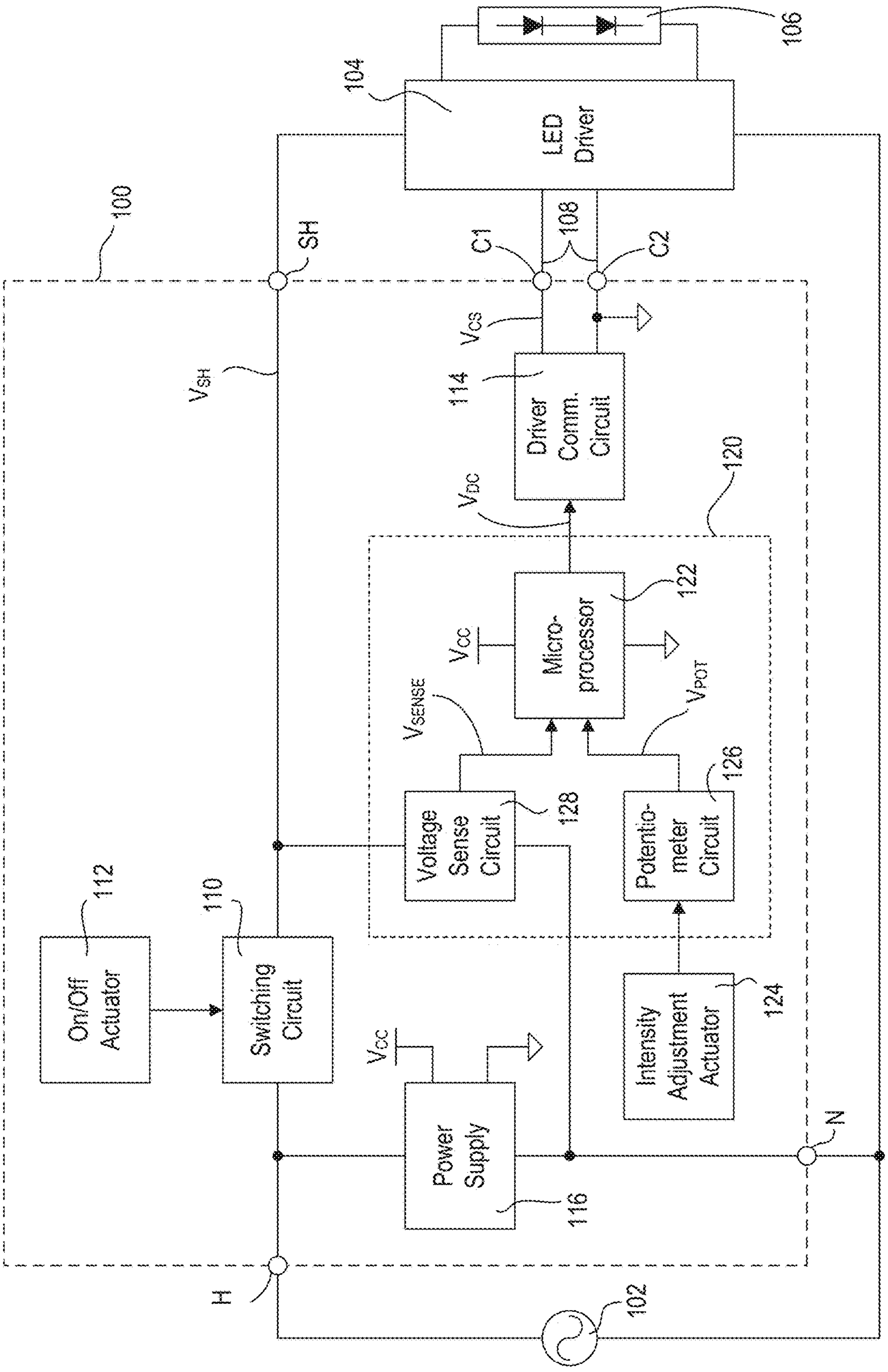
FIG. 1 is a simplified block diagram of an example 0-10V load control device.

FIG. 1 is a simplified block diagram of an example 0-10V load control device 100. The load control device 100 may comprise a hot terminal H adapted to be coupled to an AC power source 102 and a switched hot terminal SH adapted to be coupled to an electrical load. The electrical load may comprise a load regulation circuit for driving a lighting load, such as an LED driver 104 for controlling an LED light source 106. In an example, the load control device 100 may comprise a neutral terminal N adapted to be coupled to the neutral side of the AC power source 102. In another example, the load control device 100 may not require connection to the neutral side of the AC power source 102 via the neutral terminal N (e.g., the load control device may be a "two-wire" load control device).

The load control device 100 may comprise first and second control terminals C1, C2 adapted to be coupled to the LED driver 104 via a control wiring 108. The LED driver 104 may be configured to control the power delivered to the LED light source 106, and thus the intensity of the LED light source 106, in response to a direct-current (DC) control signal $V_{CS}$ received from the load control device 100 via the control wiring 108. For example, the LED driver 104 may be configured to turn the LED light source 106 on and off, and/or to adjust the intensity of the LED light source 106 between a low-end (e.g., minimum) intensity $L_{LE}$ and a high-end (e.g., maximum) intensity $L_{HE}$ in response to the control signal $V_{CS}$. The LED driver 104 may be configured to control the power delivered to the LED light source 106, for example, by regulating the voltage generated across the LED light source 106 and/or regulating the current conducted through the LED light source 106. Examples of an LED driver are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Pat. No. 9,232,574, issued Jan. 5, 2016, entitled FORWARD CONVERTER HAVING A PRIMARY-SIDE CURRENT SENSE CIRCUIT, the entire disclosures of which are hereby incorporated by reference. Although described as an LED light source driven by an LED driver, the electrical load referenced herein may comprise an electronic ballast for driving a fluorescent lamp.

The load control device 100 may comprise a switching circuit 110, which may be electrically coupled in series between the hot terminal H and the switched hot terminal SH. The switching circuit 110 may be rendered conductive and non-conductive in response to actuations of an on/off actuator 112 (e.g., a toggle switch) to generate a switched-hot voltage $V_{SH}$ at the switched hot terminal SH. The on/off actuator 112 may comprise a mechanical switch that is actuated by a slider control, for example, when the slider control reaches a minimum position (e.g., a "slide-to-off" slider control).

The load control device 100 may also include a driver communication circuit 114 that may comprise a current sink circuit adapted to sink current from the LED driver 104 via the control wiring 108. The LED driver 104 may be configured to generate a link supply voltage (e.g., approximately 10 V) to allow the current sink circuit of the driver communication circuit 114 to generate the control signal $V_{CS}$ on the control wiring 108. The load control device 100 may comprise a power supply 116 coupled between the hot terminal H and the neutral terminal N for generating a DC supply voltage $V_{CC}$ for powering the low-voltage circuitry of the load control device 100.

The load control device 100 may comprise a control circuit 120 (e.g., a digital control circuit) configured to control the driver communication circuit 114 to generate the control signal $V_{CS}$ for adjusting the intensity of the LED light source 106. The control circuit 120 may include a microprocessor 122. The control circuit 120 could also include any suitable controller or processing device, such as, for example, a programmable logic device (PLD), a microcontroller, an application specific integrated circuit (ASIC), or a field programmable gate array (FPGA). The microprocessor 122 may be configured to determine a desired light intensity $L_{DES}$ for the LED light source 106 and a corresponding desired magnitude $V_{DES}$ for the control signal $V_{CS}$ in response to an intensity adjustment actuator 124 (e.g., a slider control). For example, the microprocessor 122 may be configured to receive a DC potentiometer wiper voltage $V_{POT}$ from a potentiometer circuit 126, which may be responsive to the intensity adjustment actuator 124. The microprocessor 122 may be configured to control the magnitude of the control signal $V_{CS}$ to the desired magnitude $V_{DES}$ so as to adjust the intensity of the LED light source 106 to the desired light intensity $L_{DE}$s (e.g., between a low-end intensity $L_{LE}$ and a high-end intensity $L_{HE}$).

The microprocessor 122 of the control circuit 120 may generate a direct-current (DC) output signal $V_{DC}$ and provide the output signal $V_{DC}$ to the driver communication circuit 114. For example, the microprocessor 122 may comprise a digital-to-analog converter (DAC) for generating the DC output signal $V_{DC}$ that is received by the driver communication circuit 114 for generating the control signal $V_{CS}$. The microprocessor 122 may adjust the magnitude of the control signal $V_{CS}$ by adjusting the magnitude of the output signal $V_{DC}$. The output signal $V_{DC}$ may comprise a pulse-width modulated (PWM) signal or variable-frequency waveform, in response to which the driver communication circuit 114 may be configured to adjust the magnitude of the control signal $V_{CS}$. The driver communication circuit 114 may comprise a current source circuit or a current source/sink circuit for generating the control signal $V_{CS}$ in response to the output signal $V_{DC}$.

The LED driver 104 may be controlled to an electronic off (e.g., standby) state during which the LED driver 104 may turn off the LED light source while control circuitry of the LED driver remains powered. The LED driver 104 may be configured to change between an on state and the electronic off state in response to the control signal $V_{CS}$ (e.g., using hysteresis). For example, during the on state, the control circuit 120 may be configured to adjust the DC voltage level of the control signal $V_{CS}$ between a low-end magnitude $V_{LE}$ (e.g., approximately 0.9 volts) and a high-end magnitude $V_{HE}$ (e.g., ten volts) to adjust the intensity of the LED light source 106 between the low-end intensity $L_{LE}$ and the high-end intensity $L_{HE}$, respectively. To control the LED driver 104 into the electronic off state, the control circuit 120 may be configured to adjust the DC voltage level of the control signal $V_{CS}$ to a standby level. For example, the LED driver 104 may be configured to change to the electronic off state when the DC voltage level of the 0-10V control signal drops below a falling threshold $V_{TH-FALLING}$ (e.g., approximately 0.6 V). The LED driver 104 may be configured to return to the on state (e.g., to turn on) when the DC voltage level of the control signal $V_{CS}$ rises above a rising threshold $V_{TH-RISING}$ (e.g., approximately 1.0 V), after which the LED driver 104 may adjust the intensity of the LED light source 106 between the low-end intensity $L_{LE}$ and the high-end intensity $L_{HE}$ as the control signal $V_{CS}$ ranges between the low-end magnitude $V_{LE}$ and the high-end magnitude $V_{HE}$.

During the on state, the low-end magnitude $V_{LE}$ of the control signal $V_{CS}$ may be less than the rising threshold $V_{TH-RISING}$. For example, the low-end magnitude $V_{LE}$ of the control signal $V_{CS}$ may be approximately 0.9 V while the rising threshold $V_{TH-RISING}$ may be approximately 1.0 V. If the LED driver 104 and the load control device 100 temporarily lose power while the load control device is controlling the intensity of the LED light source 106 to the low-end intensity $L_{LE}$, the magnitude of the control signal $V_{CS}$ (e.g., the low-end magnitude $V_{LE}$) may not exceed the rising threshold $V_{TH-RISING}$ when power is restored and the LED driver 104 may not turn on the LED light source 106. Similarly, when the on/off actuator 112 is actuated to close the switching circuit 110 to turn the LED light source 106 on and the intensity adjustment actuator 122 is set to the low-end intensity $L_{LE}$, the magnitude of the control signal $V_{CS}$ may also not exceed the rising threshold $V_{TH-RISING}$ and the LED driver 104 may not turn on the LED light source 106 when the LED driver 104 is switched on by the switching circuit 110.

Accordingly, the control circuit 120 may be configured to at least temporarily increase the magnitude of the control signal $V_{CS}$ when power is applied (e.g., initially applied or re-applied) to the lighting load 106 (i.e., to the LED driver 104). For example, the control circuit 120 may be configured to temporarily increase the magnitude of the control signal $V_{CS}$ to be equal to or above the rising threshold $V_{TH-RISING}$ when power is applied to the LED driver after an interruption and the desired magnitude $V_{DES}$ for the control signal $V_{CS}$ is initially less than the rising threshold $V_{TH-RISING}$. The power interruption may be caused by a power outage or a manual switch-off of the on/off actuator 112, for example. The control circuit 120 may comprise a voltage sense circuit 128 configured to generate a voltage sense signal $V_{SENSE}$ that may indicate when power has been applied to the LED driver 104. For example, the voltage sense circuit 128 may be coupled between the switched hot terminal SH and the neutral terminal N to receive the switched-hot voltage $V_{SH}$ as shown in FIG. 1. The voltage sense circuit 128 may be configured to drive the voltage sense signal $V_{SENSE}$ high towards the supply voltage $V_{CC}$ when the magnitude of the switched-hot voltage $V_{SH}$ rises above a voltage sense threshold $V_{TH-SENSE}$ (e.g., the voltage sense circuit 128 may comprise a comparator circuit). In an example, the control circuit 120 may be configured to determine that power has just been applied to the LED driver 104 in response to detecting a rising edge of the voltage sense signal $V_{SENSE}$. In another example, the voltage sense signal $V_{SENSE}$ may simply be a scaled version of the switched-hot voltage $V_{SH}$ (e.g., the voltage sense circuit 128 may comprise a scaling circuit, such as a resistive divider), and the control circuit 120 may be configured to sample the voltage sense signal $V_{SENSE}$ and compare the sampled magnitude to the voltage sense threshold $V_{TH-SENSE}$ to determine when power has just been applied (or re-applied) to the LED driver 104.

While the switching circuit 110 and the on/off actuator 112 is shown in FIG. 1 as integral with the load control device 100, the switching circuit and/or the on/off actuator 112 could be external to the load control device 100 (e.g., the switching circuit could be included in an external light switch or an external switching power pack). In addition, the switching circuit 110 could comprise a relay controlled by the microprocessor 122 and the on/off actuator 112 could comprise a low-voltage switch (e.g., a mechanical tactile switch) for generating a low-voltage signal that is received by the microprocessor 122. The microprocessor 122 may be configured to detect that the low-voltage switch has been actuated, close the relay, and temporarily increase the magnitude of the control signal $V_{CS}$ (e.g., without the need for the voltage sense circuit 128).

As described herein, power being applied (e.g., initially applied or re-applied) to the lighting load 106 may occur when power is restored after a temporary power interruption (e.g., by an electrical utility company), when the switching circuit 110 is closed, and/or when an external switching circuit (e.g., in a light switch or a switching power pack) coupled in series between the AC power source 102 and the lighting load 106 is closed. One of ordinary skill in the art will recognize that there are other ways that power may be applied to a lighting load.

Figure 2:
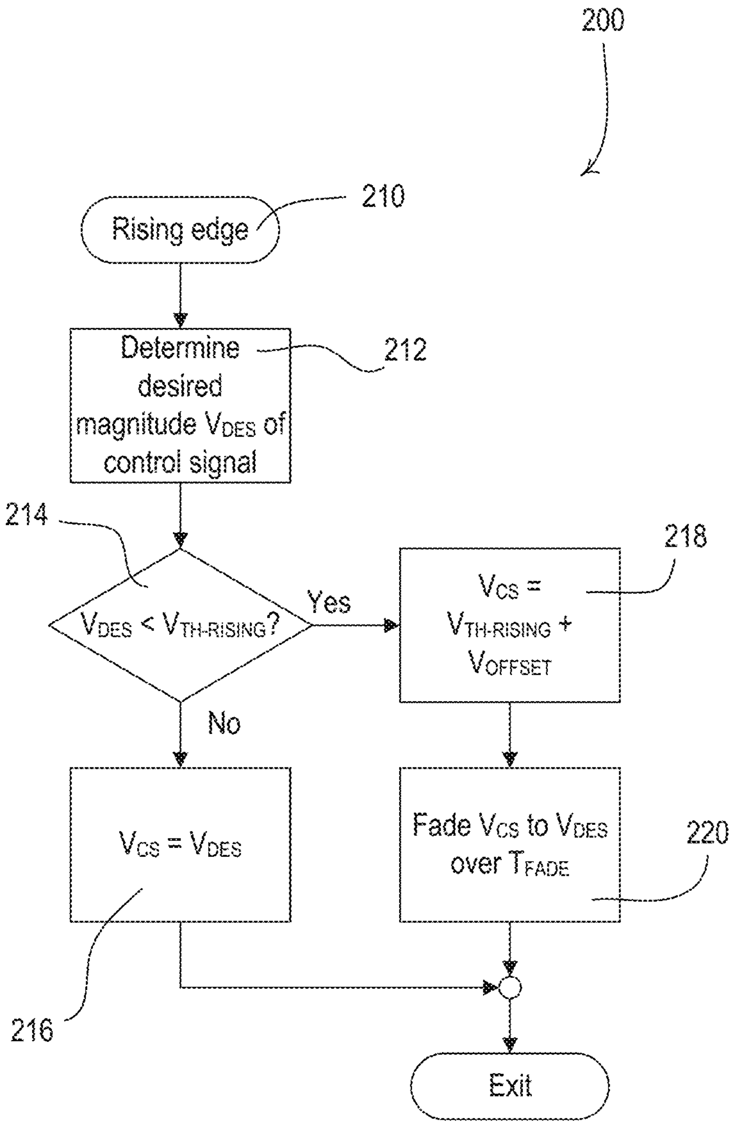
FIG. 2 is a simplified flowchart of a voltage sense procedure that may be executed by a microprocessor of a control circuit of the load control device of FIG. 1.
Figure 3:
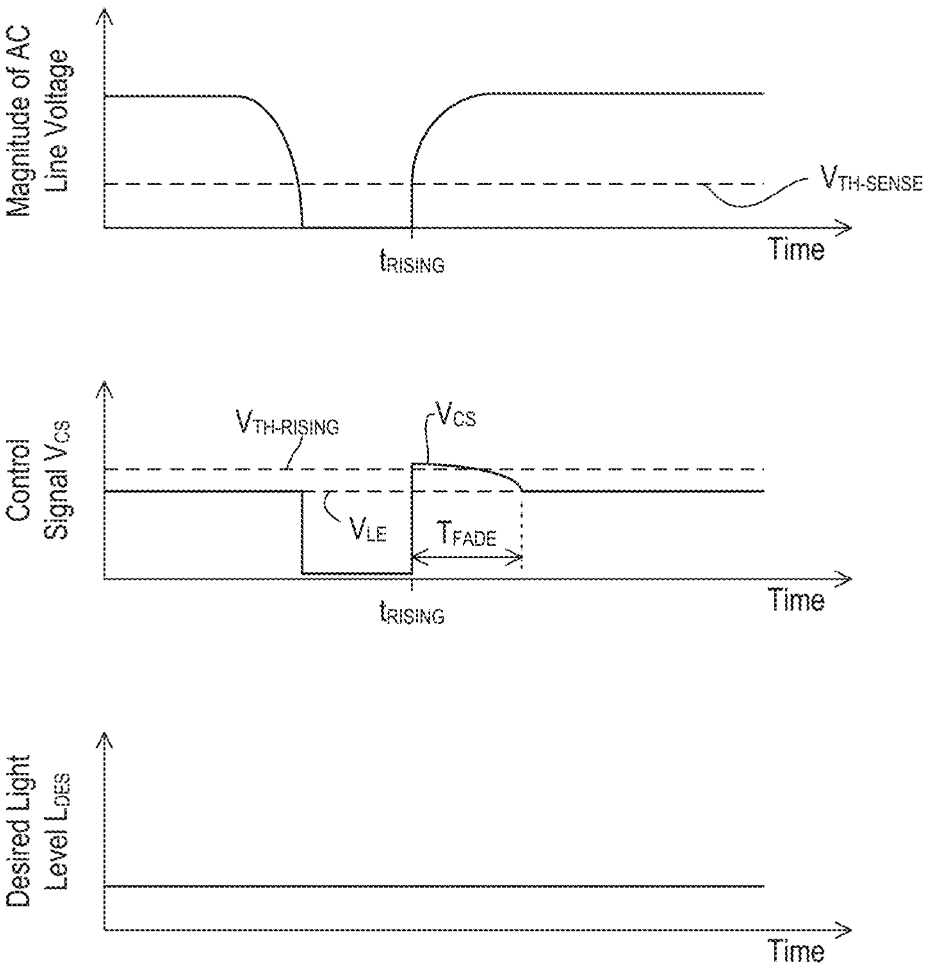
FIG. 3 is a simplified diagram of example waveforms illustrating the operation of the load control device during the voltage sense procedure of FIG. 2.

FIG. 2 is a simplified flowchart of a voltage sense procedure 200 that may be executed by the microprocessor 122 of the control circuit 120 of the load control device 100. FIG. 3 is a simplified diagram of example waveforms illustrating the operation of the load control device 100 during the voltage sense procedure 200. The voltage sense procedure 200 may begin when the microprocessor 122 detects a rising edge of the voltage sense signal $V_{SENSE}$ at step 210 indicating that power has just been applied to the LED driver 104 (e.g., as shown at time $t_{RISING}$ in FIG. 3), e.g., after an interruption. The microprocessor 122 may then determine the desired magnitude $V_{DES}$ for the control signal $V_{CS}$ (e.g., using the desired light intensity $L_{DES}$ determined from the intensity adjustment actuator 122) at step 212. If the desired magnitude $V_{DES}$ is not less than the rising threshold $V_{TH\text{-}RISING}$ at step 214, the microprocessor 122 may set the magnitude of the control signal $V_{CS}$ to the desired magnitude $V_{DES}$ at step 216, before the voltage sense procedure 200 exits. If the desired magnitude $V_{DES}$ is less than the rising threshold $V_{TH\text{-}RISING}$ at step 214, the microprocessor 122 may set the magnitude of the control signal $V_{CS}$ to be equal to the rising threshold $V_{TH\text{-}RISING}$ plus an offset voltage $V_{OFFSET}$ at step 218. For example, the offset voltage $V_{OFFSET}$ may be sized to ensure that the magnitude of the control signal $V_{CS}$ is greater than the rising threshold $V_{TH\text{-}RISING}$ when power is applied to the LED driver 104 (e.g., as shown at time $t_{RISING}$ in FIG. 3) so as to drive the LED driver 104 to the on state. The microprocessor 122 may then fade (e.g., adjust) the magnitude of the control signal $V_{CS}$ to the desired magnitude $V_{DES}$ (e.g., the low-end magnitude $V_{LE}$ as shown in FIG. 3) over a first period of time $T_{FADE}$, which may be approximately 0.5-1 second, at step 220, before the voltage sense procedure 200 exits. While not shown in FIG. 2, the microprocessor 122 may hold the magnitude of the control signal $V_{CS}$ equal to the rising threshold $V_{TH\text{-}RISING}$ plus the offset voltage $V_{OFFSET}$ for a second period of time before beginning to fade the magnitude of the control signal $V_{CS}$ to the desired magnitude $V_{DES}$ over the period of time $T_{FADE}$.

The operation of the control circuit 120 in response to the application of power to the LED driver 104 may be controllable and/or programmable. For example, the control circuit 120 may be configured to adjust the magnitude of the offset voltage $V_{OFFSET}$, and/or the length of the first and/or the second time period (e.g., the period of time $T_{FADE}$), in response to an external input (e.g., a programming input). The external input may be received, for example, from an actuation of the intensity adjustment actuator 124 and/or the on/off actuator 112, an actuation of one or more programming buttons (not shown), an actuation of one or more separate programming potentiometers (not shown), and/or one or more messages received via a communication circuit (not shown).

Figure 4:
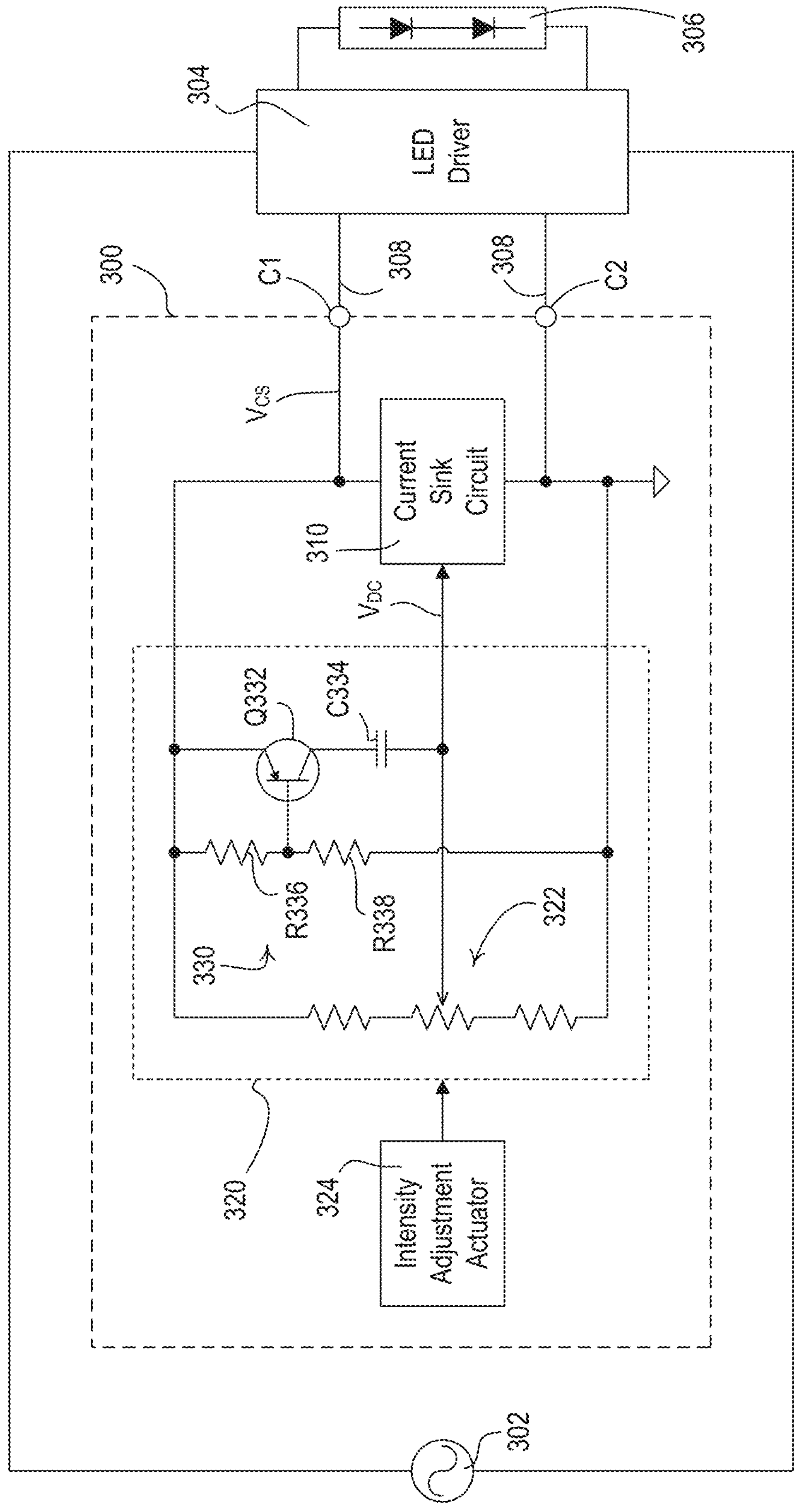
FIG. 4 is a simplified block diagram of another example 0-10V load control device.

FIG. 4 is a simplified block diagram of another example of a 0-10V load control device 300. The load control device 300 may be configured to control an amount of power delivered to an electrical load. The electrical load may include, e.g., a load regulation circuit for driving the electrical load, such as an LED driver 304 for controlling an LED light source 306. The load control device 300 may or may not be electrically coupled in series between an AC power source 302 and the electrical load. The load control device 300 may comprise first and second control terminals C1, C2 adapted to be coupled to the LED driver 304 via a control wiring 308. The load control device 300 may comprise a communication circuit configured to generate a control signal for controlling power delivered to the LED lighting load 306. The load control device 300 may include, for example, a current sink circuit 310 electrically coupled to the control terminals C1, C2 for sinking current from the LED driver 104 via the control wiring 108. The current sink circuit 310 may be configured to generate a DC control signal $V_{CS}$ for controlling the LED driver 304 to turn the LED light source 306 on and off, and to adjust the intensity of the LED light source 306 when the LED light source 306 is on.

The load control device 300 may comprise a control circuit 320 (e.g., an analog control circuit) configured to control the current sink circuit 310 to generate the control signal $V_{CS}$ for turning the LED light source 306 on and off, and for adjusting the intensity of the LED light source 306. The control circuit 320 may comprise a potentiometer circuit 322 for generating a DC output signal $V_{DC}$ in response to an intensity adjustment actuator 324 (such as, e.g., a slider control, a thumbwheel, or a knob). The potentiometer circuit 322 may provide the DC output signal $V_{DC}$ to the current sink circuit 310 for controlling the magnitude of the control signal $V_{CS}$ to a desired magnitude $V_{DES}$ so as to adjust the intensity of the LED light source 306 to a desired light intensity $L_{DES}$ (e.g., between a low-end intensity $L_{LE}$ and a high-end intensity $L_{HE}$).

The LED driver 304 may be controlled to an electronic off (e.g., standby) state during which the LED driver 304 may turn off the LED light source while control circuitry of the LED driver remains powered (e.g., in a similar manner as the LED driver 104 shown in FIG. 1). The LED driver 304 may be configured to change between an on state and the electronic off state in response to the control signal $V_{CS}$ (e.g., using hysteresis). For example, the LED driver 304 may be configured to change to the on state (i.e., to turn on) when the DC voltage level of the control signal $V_{CS}$ rises above a rising threshold $V_{TH\text{-}RISING}$ (e.g., approximately 1.0 V).

As with the load control device 100 of FIG. 1, the low-end magnitude $V_{LE}$ of the control signal $V_{CS}$ generated by the load control device 300 may be less than the rising threshold $V_{TH\text{-}RISING}$. In some cases (such as, e.g., when a desired magnitude of the control signal $V_{CS}$ is less than the rising threshold $V_{TH\text{-}RISING}$ when power is applied to the LED light source 306), the control circuit 320 may be configured to temporarily increase the magnitude of the control signal $V_{CS}$ to be equal to or greater than the rising threshold $V_{TH\text{-}RISING}$ before decreasing the magnitude of the control signal $V_{CS}$ to the desired magnitude. The control circuit 320 may be configured to determine when power is applied to the LED light source 306 (e.g., to the LED driver 304) in response to the magnitude (e.g., a change of the magnitude) of the control signal $V_{CS}$ generated by the current sink circuit 310. For example, the LED driver 304 may be configured to generate a link supply voltage to allow the current sink circuit 310 to generate the control signal $V_{CS}$ on the control wiring 308. As such, the magnitude of the control signal $V_{CS}$ may indicate when the LED driver 304 is powered. For example, when the LED driver 304 is unpowered, the magnitude of the control signal $V_{CS}$ may drop to approximately zero volts. When power is restored, the magnitude of the control signal $V_{CS}$ may rise back to the level before power was lost. The control circuit 320 may be configured to determine that power has been lost and re-applied based on the changes (e.g., the drop and rise) in the magnitude of the control signal $V_{CS}$.

Figure 5:
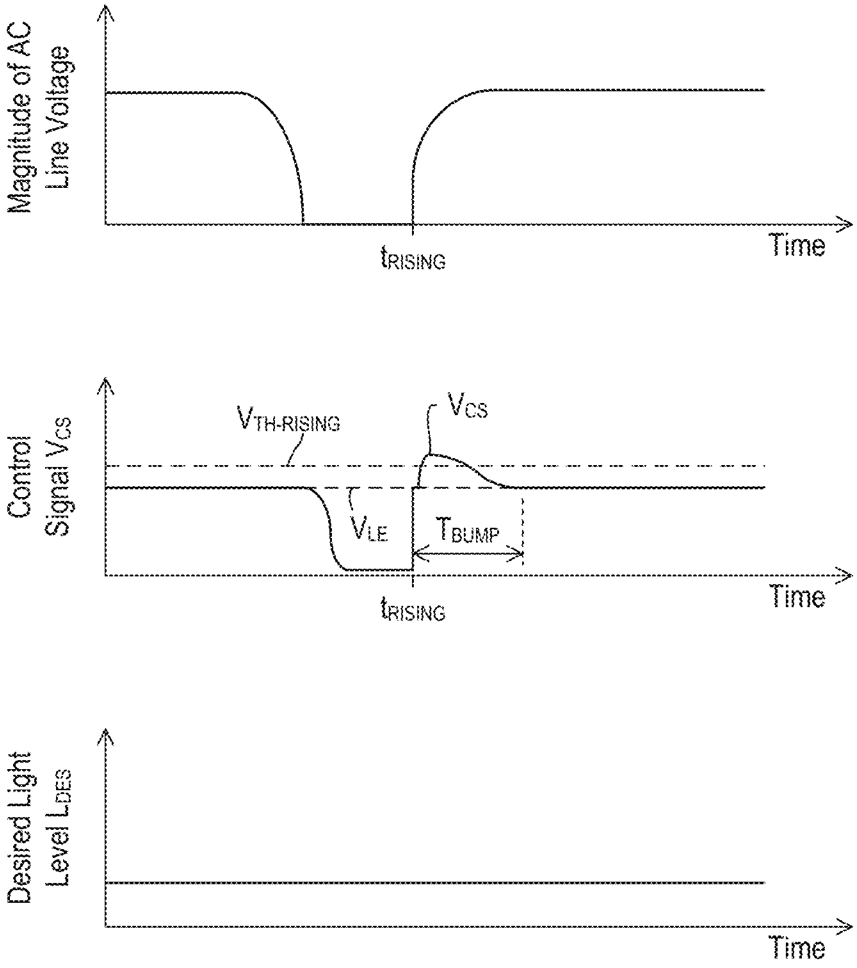
FIG. 5 is a simplified diagram of example waveforms illustrating the operation of a bump-up circuit of the load control device of FIG. 4.

The control circuit 320 may comprise a bump-up circuit 330 for temporarily increasing the magnitude of the control signal $V_{CS}$ (e.g., when power is applied to the LED driver 304). FIG. 5 is a simplified diagram of example waveforms illustrating the operation of the bump-up circuit 330 of the load control device 300. The bump-up circuit 330 may comprise a bipolar junction transistor Q332 that may in turn include a collector coupled to an anode of a capacitor C334, the series combination of which is coupled between the first control terminal C1 and the wiper of the potentiometer circuit 322 (e.g., the DC output signal $V_{DC}$ of the control circuit 320), with an emitter of the transistor Q332 coupled to the first control terminal C1, and a cathode of the capacitor C334 coupled to the wiper of the potentiometer circuit 322 and the current sink circuit 310. The bump-up circuit 330 may further comprise two resistors R336, R338 coupled in series between the first and second control terminals C1, C2. The tie point of the resistors R336, R338 may be coupled to the base of the transistor Q332.

When the magnitude of the control signal $V_{CS}$ is approximately zero volts (e.g., the LED driver 304 is unpowered), the transistor Q332 may be non-conductive and the capacitor C334 may be uncharged. After power is applied to the LED driver 304, the LED driver 304 may begin to generate the link supply voltage (e.g., across the resistors R334, R336 of the bump-up circuit 330). Once the voltage across the resistor R334 exceeds the rated emitter-base voltage of the transistor Q332, the transistor may become conductive. When the transistor Q332 first becomes conductive, the capacitor C334 may be uncharged, and thus the transistor Q332 may pull the magnitude of the DC output signal $V_{DC}$ up towards the magnitude at the first control terminal C1. This may cause the current sink circuit 310 to temporarily increase the magnitude of the control signal $V_{CS}$ to be greater than the rising threshold $V_{TH\text{-}RISING}$ (e.g., by an offset voltage $V_{OFFSET}$). As the capacitor C334 charges, the magnitude of the DC output signal $V_{DC}$ may continue to fall until the capacitor C334 is fully charged and the magnitude of the DC output signal $V_{DC}$ has returned to the level determined by the potentiometer circuit 322 and the intensity adjustment actuator 324 (e.g., the low-end magnitude $V_{LE}$ as shown in FIG. 5). The bump-up circuit 330 may be configured to temporarily increase the magnitude of the control signal $V_{CS}$ for a bump-up period $T_{BUMP}$ (e.g., as shown in FIG. 5).

The invention claimed is:

1. A light-emitting diode (LED) controller, comprising:
- a voltage sense interface circuit to receive a signal indicative of an application of an input voltage to the LED controller;
- a communication interface circuit couplable to an LED driver circuit;
- an LED control circuit to:
  - receive, via the voltage sense interface, the signal indicative of application of the input voltage to the LED controller;
  - determine a target control signal value that corresponds to a received desired light intensity;
  - determine whether the target control signal value is less than a threshold control signal value; and
  - responsive to the determination that the target control signal value is less than the threshold control signal value:
    - determine a temporary control signal value based on the threshold control signal value plus an offset value;
    - generate an output signal at the determined temporary control signal value;
    - communicate the output signal to an operatively coupled LED driver circuit; and
    - cause a transition of the output signal communicated to the operatively coupled LED driver circuit from the determined temporary control signal value to the target control signal value.

2. The LED controller of claim 1, wherein to determine the target control signal value based on the received desired light intensity, the LED control circuit to further:
- retrieve, from an operatively coupled memory circuit, a stored control signal value that corresponds to the received desired light intensity.

3. The LED controller of claim 1, wherein the LED control circuit to further:
- retrieve, from an operatively coupled memory circuit, data indicative of a fade period.

4. The LED controller of claim 3, wherein to cause the transition of the output signal communicated to the operatively coupled LED driver circuit from the determined temporary control signal value to the target control signal value, the LED control circuit to:
- cause the transition of the output signal communicated to the operatively coupled LED driver circuit from the determined temporary control signal value to the target control signal value over the retrieved fade period.

5. The LED controller of claim 1, further comprising an intensity adjustment actuator;
- wherein, the LED control circuit to further:
  - receive the desired light intensity via the intensity adjustment actuator.

6. The LED controller of claim 1, further comprising a wireless communication interface;
- wherein, the LED control circuit to further:
  - receive the desired light intensity via the wireless communication interface.

7. A light-emitting diode (LED) control method, comprising:
- receiving, by an LED control circuit disposed in an LED controller, a signal from a voltage sense circuit indicative of an application of an input voltage to the LED controller;
- determining, by the LED control circuit, a target control signal value corresponding to a received desired light intensity;
- determining, by the LED control circuit, whether the target control signal value is less than a threshold control signal value; and
- responsive to the determination that the target control signal value is less than the threshold control signal value:
  - determining, by the LED control circuit, a temporary control signal value based on the threshold control signal value plus an offset value;
  - generating, by the LED control circuit, an output signal at the determined temporary control signal value;
  - causing, by the LED control circuit, a communication of the generated output signal to an operatively coupled LED driver circuit via a communication interface circuit; and
  - causing, by the LED control circuit, a transition of the generated output signal from the determined temporary control signal value to the determined target control signal value.

8. The LED control method of claim 7, wherein determining the target control signal value based on the received desired light intensity further comprises:

retrieving, by the LED control circuit, a stored control signal value that corresponds to the received desired light intensity from a communicatively coupled memory circuit.

9. The LED control method of claim 7, further comprising:

retrieving, by the LED control circuit, data indicative of a fade period from operatively coupled memory circuit.

10. The LED control method of claim 9, wherein causing the transition of the output signal communicated to the operatively coupled LED driver circuit from the determined temporary control signal value to the target control signal value, further comprises:

causing, by the LED control circuit, the transition of the output signal communicated to the operatively coupled LED driver circuit from the determined temporary control signal value to the target control signal value over the fade period.

11. The LED control method of claim 7, further comprising:

receiving, by the LED control circuit, an input indicative of the desired light intensity via an intensity adjustment actuator.

12. The LED control method of claim 7, further comprising:

receiving, by the LED control circuit, an input indicative of the desired light intensity via a communicatively coupled wireless communication interface.

13. A non-transitory, machine-readable, storage device that includes instructions that, when executed by a light-emitting diode (LED) control circuit disposed in an LED lighting controller, cause the LED control circuit to:

receive, via a voltage sense interface, a signal indicative of an application of an input voltage to the LED lighting controller;

determine a target control signal value that corresponds to a received desired light intensity;

determine whether the target control signal value is less than a threshold control signal value; and responsive to the determination that the target control signal value is less than the threshold control signal value:

determine a temporary control signal value based on the threshold control signal value plus an offset value;

generate an output signal at the determined temporary control signal value;

cause a communication of the generated output signal to an operatively coupled LED driver circuit via a communication interface circuit; and cause a transition of the generated output signal from the determined temporary control signal value to the determined target control signal value.

14. The non-transitory, machine-readable, storage device of claim 13 wherein the instructions that cause the LED control circuit to determine the target control signal value that corresponds to the received desired light intensity further cause the LED control circuit to:

retrieve, from a communicatively coupled memory circuit, a stored control signal value that corresponds to the received desired light intensity.

15. The non-transitory, machine-readable, storage device of claim 13 wherein the instructions, when executed by the LED control circuit, cause the LED control circuit to further:

retrieve, from a communicatively coupled memory circuit, data indicative of a fade period.

16. The non-transitory, machine-readable, storage device of claim 15, wherein the instructions that cause the LED control circuit to cause the transition of the output signal communicated to the operatively coupled LED driver circuit from the determined temporary control signal value to the target control signal value, further cause the LED control circuit to:

cause the transition of the output signal communicated to the LED driver circuit from the determined temporary control signal value to the target control signal value over the fade period.

17. The non-transitory, machine-readable, storage device of claim 13, wherein the instructions, when executed by the LED control circuit, cause the LED control circuit to:

receive an input indicative of the desired light intensity via an intensity adjustment actuator.

18. The non-transitory, machine-readable, storage device of claim 13, wherein the instructions, when executed by the LED control circuit, cause the LED control circuit to:

receive an input indicative of the desired light intensity via a communicatively coupled wireless communication interface.

* * * * *